July 27, 1937.  P. VIERKÖTTER  2,088,352
PROCESS AND MEANS FOR JOINING MATERIALS Filed Feb. 8, 1933

INVENTOR
Paul Vierkötter
By Richardson & ...
ATTORNEYS

Patented July 27, 1937

2,088,352

UNITED STATES PATENT OFFICE 2,088,352

PROCESS AND MEANS FOR JOINING MATERIALS

Paul Vierkötter, Berlin-Grunewald, Germany, assignor of one-fourth to George A. Auer, Chicago, Ill.

Application February 8, 1933, Serial No. 655,758
In Germany March 11, 1932

6 Claims. (Cl. 69—1)

This invention is concerned with a new process and novel means for joining materials.

The joining of materials, such as wood, paper, rubber, leather, etc., can be accomplished in many ways, for example, by nailing, stitching, or gluing. The latter manner of joining such materials is rapidly superseding other methods. This is particularly true in the case of the shoe industry where shoe soles of leather of the like are fastened to bodies of shoes. Gluing furnishes a product of greater durability and maintains elasticity of the materials. The gluing surface is not affected by chemical influence and glued soles are more waterproof. However, the general introduction and the application of gluing processes was retarded until recently due to the fact that expensive pressing-machinery was required, and also due to the fact that considerable time was needed for carrying out the work.

The present invention overcomes the disadvantages and draw backs intimated above.

According to my invention, the gluing process is carried out entirely or in part within a wholly or partially evacuated chamber thus utilizing the outer atmospheric pressure for exerting pressure on the parts which are to be glued together. Layers of suitable material may be provided between the surfaces which are to be glued together and the surface taking the pressure for the purpose of absorbing fluids contained in the adhesive substances, and also for absorbing remnants of moisture contained in the material. These layers may be porous and, if desired, may be suitably heated. A quick evaporation of the solvents of the adhesive and, accordingly, a quicker drying is achieved due to the fact that the gluing takes place in a vacuum, or, rather, within an exhausted chamber. The time for gluing, is, consequently, decreased, and the use of expensive and frequently highly inflammable solvents designed to evaporate easily at normal pressure, is avoided. Slowly-volatile, highly boiling, non-combustible solvents may be employed. A further advantage resides in the fact that it is not necessary to attach great importance to the absolute dryness of the parts to be glued together. The time for effective gluing is further reduced because the pores of the material to be fastened are laid open by the reduced pressure. The adhesives can easily penetrate. This action will be accelerated if the quick carrying off of the solvents is taken care of, i. e., if the surfaces of the parts to be joined are efficiently freed in spite of the pressure on these surfaces. This may be accomplished by providing between the pressure surfaces and the free outer surfaces of the parts to be joined—(particularly the surface opposite the gluing surface)—means, e. g., a porous body or substance which permits and supports the escape of the solvents. However, this body should have pores big enough to take care of this function but sufficiently minute so that the pressure on the pressing surface is not disturbed. Blotting paper or the like would be generally suitable for this purpose.

This intermediate layer may be treated so that it can be heated if desired. It is likewise clear that the entire device may be heated if it is desired or found necessary. Concerning the kind of material used for this intermediate layer, as well as its shape and form, and particular properties, these qualities will be determined by the requirements arising in each individual case. The scope of the invention in this respect, is limited only by the materials which are available for this purpose. It may be mentioned at this point that material with larger pores may be employed when it is desired to join wood by my novel method.

The essence of the invention, in regard to this intermediate layer or layers resides in preventing a tight enclosure of the material to be joined, particularly between the surface opposite the joining surface and the surface taking the pressure; also to provide for a sufficiently large suitable porous space between these surfaces—(obtained, e. g., by unevenness of the pressing surface)—for efficiently carrying off the solvent of the adhesives, and/or the moisture of the material in spite of the pressure applied.

My invention furnishes a method and means for accomplishing the gluing process within the shortest possible time. It is particularly suitable and adapted in a case where pliable material such as leather is to be joined to leather or generally to shoes. I have used the term "gluing" throughout, but brief reflection will show that it is not "gluing" in an orthodox sense, where the adhesive remains between two surfaces to be joined. In my method the adhesive actually penetrates into the materials and joins them into a unit. This action may even be compared with what takes place in welding materials. The term "joining" also employed in this specification is understood in its broadest sense.

The apparatus required for carrying out my invention is extraordinarily simple as is described below:

A container or receptacle open on the top is provided with a pipe for exhausting the same, i. e., for providing a pressure below atmospheric in the interior of the container. A simple water-jet-air pump may be secured to the pipe or another suitable air pump may be used. Within the receptacle is provided a supporting means or one or more carriers or the like for receiving materials to be joined. This supporting means may comprise a sieve-like sheet metal member or similar device, resting on suitable supports. The lid or cover for the container comprises a frame member carrying a flexible or elastic sheet, e. g., a sheet of suitable rubber. The frame may rise over the base of the cover, while the flexible sheet lies preferably close to the suitably formed upper edges of the container.

The parts to be joined, for example, leather parts, are arranged on the supporting means, and adhesive is applied between them. The lid or cover is closed and the container is then suitably exhausted. The rubber part of the cover is drawn into the container with a force determined by the vacuum applied. The atmospheric pressure then takes the action of pressing the flexible cover down. The cover or diaphragm contacts the parts within the container and thus transmits to the parts the requisite pressure at the points where it is necessary. An embodiment of the invention is shown somewhat schematically in Figures 1 and 2 of the drawings.

Figure 1:
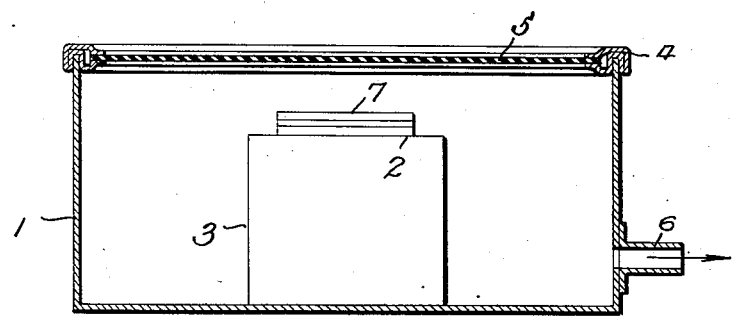
Fig. 1 shows the apparatus before the pressure is applied.

Numeral 1 is the receptacle or container. The supporting means 3 furnishes the supporting surface 2. The frame 4 of the cover is provided with the previously mentioned elastic diaphragm 5. This diaphragm may be made of India rubber cloth or the like. The receptacle is exhausted by way of the pipe 6.

Figure 2:
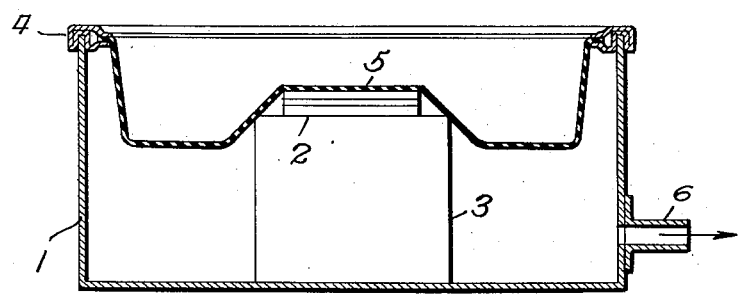
Fig. 2 illustrates the device with the elastic diaphragm cover applying the pressure to the parts to be joined.

It will be seen from Fig. 2 that the elastic diaphragm 5 of the cover is drawn into and pressed into the interior of the container by the outer atmospheric pressure, thereby causing a pressure on the material 7 disposed on the supporting surface.

I have specifically shown and described a certain embodiment of the invention. There are, of course, numerous other embodiments possible. Stamp- or die-like devices may be employed for transmitting the necessary pressure. Any suitable means may be employed for applying the requisite vacuum. The structure of the container and the cover or lid, and also the cooperation of these parts may be changed as desired. The essence of the invention resides in the use or simultaneous use of the outer atmospheric pressure in order to produce the pressure required for joining the materials, so as to cause the easy evaporation of the solvents, and/or of the moisture contained in the materials, together with the additional advantages of utilizing the existing pressure.

It will, therefore, be understood that I do not desire to be limited to the exact structure shown, but that I intend to use all such embodiments as may fall within the scope of the claims which follow.

I claim as my invention:

1. The process of gluing soles on shoes, consisting in placing an adhesive substance between a sole and a shoe, in placing absorbing material adjacent said sole and shoe and in applying pressure below atmospheric to exert pressure on said sole, said material absorbing volatile matter thrown off from said adhesive substance and from said sole.

2. The process of gluing soles on shoes, consisting in disposing adhesive substance between a sole and a shoe, in placing absorbing material adjacent said sole and shoe, and in applying pressure to said sole and pressure below atmospheric to said sole and said shoe.

3. The method of gluing a sole to a shoe consisting in assembling said sole and said shoe, in subjecting said assembly to pressure below atmospheric, in simultaneously applying pressure upon said sole, and in simultaneously absorbing volatile matter thrown off from said assembly during the application of said pressures.

4. A device for gluing materials comprising, a receptacle for receiving said materials with the adhesive gluing substance applied to the joining points thereof, cover means for closing said receptacle, means for creating within said receptacle a pressure below atmospheric, means in said cover means responsive to said pressure for exerting a pressure upon said materials, and means in said receptacle for absorbing volatile matter thrown off responsive to said pressure.

5. A device for gluing materials comprising, a receptacle for receiving said materials with the adhesive gluing substance applied to the joining points thereof, cover means for closing said receptacle, means for creating within said receptacle a pressure below atmospheric, means in said cover means responsive to said pressure for exerting a pressure upon said materials, means in said receptacle for absorbing volatile matter thrown off responsive to said pressure, and means for applying heat to accelerate said gluing process.

6. A device for joining materials comprising, a box-like receptacle having an upper open end wherein said materials are placed with adhesive substance disposed between the joining surfaces thereof, a removable lid for said receptacle including an elastic diaphragm the peripheral portions of which lie substantially close to the upper edges of said open end of said receptacle and the central portion of which lies across said open end when said lid is placed thereon, means for creating within said receptacle pressure below atmospheric whereby said elastic diaphragm is gradually drawn into said receptacle against said materials therein and gradually engages said materials with increasing pressure without disturbing the position of said materials relative to each other, and means in said receptacle for absorbing volatile matter thrown off from said materials and from said adhesive substance during the application of said pressure.

PAUL VIERKÖTTER.